(12) United States Patent
Kerr et al.

(10) Patent No.: US 6,213,183 B1
(45) Date of Patent: Apr. 10, 2001

(54) LAMINATOR ASSEMBLY HAVING AN ENDLESS BELT

(75) Inventors: Roger S. Kerr, Brockport; John D. Gentzke, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/133,248

(22) Filed: Aug. 13, 1998

(51) Int. Cl.$^7$ ........................................................ B30B 5/06
(52) U.S. Cl. ........................... 156/358; 156/498; 156/555; 156/579; 156/583.5; 100/154
(58) Field of Search ..................... 156/311, 312, 156/324, 358, 555, 498, 583.1, 583.5, 579; 100/151, 153, 154; 425/371

(56) References Cited

U.S. PATENT DOCUMENTS

| | | |
|---|---|---|
| Re. 33,288 | 8/1990 | Obayashi . |
| 3,547,742 * | 12/1970 | Cottrell ................................ 156/312 |
| 3,658,629 | 4/1972 | Cramer et al. . |
| 3,743,403 | 7/1973 | Sanza . |
| 3,781,517 | 12/1973 | Skamra . |
| 3,781,902 | 12/1973 | Shim et al. . |
| 3,810,735 | 5/1974 | Moser . |
| 3,976,370 | 8/1976 | Goel et al. . |
| 4,242,566 | 12/1980 | Scribner . |
| 4,253,008 | 2/1981 | Dolan . |
| 4,353,776 | 10/1982 | Giulie et al. . |
| 4,427,474 | 1/1984 | Ottaviano . |
| 4,435,633 | 3/1984 | Stryjewski . |
| 4,470,589 | 9/1984 | Singer . |
| 4,496,415 | 1/1985 | Sprengling . |
| 4,521,095 | 6/1985 | Mayer . |
| 4,582,416 | 4/1986 | Karz et al. . |
| 4,912,486 | 3/1990 | Yumino . |
| 4,922,304 | 5/1990 | Gilbert et al. . |
| 4,937,631 | 6/1990 | Kim et al. . |
| 4,966,464 | 10/1990 | Matoushek . |
| 4,985,731 | 1/1991 | Sakakura et al. . |
| 5,034,087 * | 7/1991 | Denker et al. ........................ 156/555 |
| 5,053,828 | 10/1991 | Ndebi et al. . |
| 5,055,884 | 10/1991 | Ndebi et al. . |
| 5,081,502 | 1/1992 | Mitsuya et al. . |
| 5,145,548 * | 9/1992 | Yamamoto ........................... 156/350 |
| 5,153,656 | 10/1992 | Johnson et al. . |
| 5,203,942 * | 4/1993 | DeCook et al. ..................... 156/230 |
| 5,262,834 | 11/1993 | Kusaka et al. . |

(List continued on next page.)

Primary Examiner—James Sells
(74) Attorney, Agent, or Firm—David A. Novais; Nelson Adrian Blish

(57) ABSTRACT

A laminator assembly and method utilizes an endless belt (17a, 17b, 300) and roller arrangement to apply pressure to media (100) to be laminated and to convey the media in a controlled manner to heated pressure rollers (11a, 11b, 301, 307). In one feature of the invention, control nips can be provided on one or both sides of the heated pressure rollers so as to minimize or eliminate flutes or ripples in the media to be laminated. The control nips can be applied by plate assemblies (29, 30, 315) which create the control nip and also serve to gain control of the media to be laminated prior to the media reaching the heated pressure roller arrangement. In the case where the plate assembly is downstream of the heated pressure roller arrangement, the plates can serve to hold the media flat while it cools down. The endless belts apply a tapering and controlled pressure to the media prior to the media reaching the heated pressure rollers where lamination occurs.

18 Claims, 9 Drawing Sheets

U.S. PATENT DOCUMENTS

| | | |
|---|---|---|
| 5,268,559 | 12/1993 | Jacobs . |
| 5,268,989 | 12/1993 | Moslehi et al. . |
| 5,272,967 * | 12/1993 | Held ............................... 156/583.5 X |
| 5,275,715 | 1/1994 | Tuttle . |
| 5,293,537 | 3/1994 | Carrish . |
| 5,300,182 | 4/1994 | DeCook et al. . |
| 5,300,183 | 4/1994 | DeCook . |
| 5,311,269 | 5/1994 | Aslam et al. . |
| 5,321,480 | 6/1994 | Merle et al. . |
| 5,339,148 | 8/1994 | Johnson et al. . |
| 5,349,424 | 9/1994 | Dalal et al. . |
| 5,356,507 | 10/1994 | Wojtanowitsch et al. . |
| 5,356,833 | 10/1994 | Maniar et al. . |
| 5,358,901 | 10/1994 | Fiordalice et al. . |
| 5,421,255 | 6/1995 | Kryk . |
| 5,428,430 | 6/1995 | Aslam et al. . |
| 5,478,434 | 12/1995 | Kerr et al. . |
| 5,489,974 | 2/1996 | Kamaji et al. . |
| 5,512,126 | 4/1996 | Kannabiran et al. . |
| 5,531,854 | 7/1996 | Kerr et al. . |

\* cited by examiner

LAMINATOR ASSEMBLY HAVING AN ENDLESS BELT

FIELD OF THE INVENTION

The present invention relates to the art of color proofing. In particular, to an improved lamination assembly for preparing prepress color proofs, such as by the use of pressure and heat to laminate media together.

BACKGROUND OF THE INVENTION

Prepress color proofing is a procedure that is used by the printing industry for creating representative images of printed material to check for color balance and other important image quality control parameters, without the high cost and time that is required to actually produce printing plates and set up a printing press to produce an example of an intended image. These intended images may require several corrections and may be reproduced several times to satisfy or meet the requirements of the customers, resulting in a large loss of profits and ultimately higher costs to the customer.

Generally speaking, color proofs sometimes called "off press" proofs or prepress proofs, are one of three types: namely (1) a color overlay that employs an image on a separate base for each color; (2) a single integral sheet process in which the separate color images are transferred by lamination onto a single base; and (3) a digital method in which the images are produced directly onto or transferred by lamination onto a single base from digital data.

In one typical process for a prepress color proofing system used in the printing industry, a multicolor original is separated into individual transparencies, called color separations, the three subtractive primaries and black. Typically a color scanner is used to create the color separations and in some instances more than four color separations are used. The color separations are then used to create a color proof sometimes called an "off press" proof or prepress proof as described above.

A KODAK Color Proofing Laminator can be used to bond lamination sheets to receiver stock as a part of a color proofing system. The lamination sheets include a carrier and a layer of material to be applied to the receiver stock, which, in the case of the Kodak Color Proofing Laminator, is a color donor. A lamination sheet is laid upon the receiver stock with the color donor side sandwiched between the carrier and the receiver stock forming a lamination sandwich.

FIG. 1 shows a laminator 12 as described in U.S. Pat. No. 5,478,434. As shown in FIG. 1, a lamination sandwich 10 sits on an entrance table 20. A leading edge of lamination sandwich 10 is fed into a laminator 12 which includes an upper heated pressure roller and a lower heated pressure roller. Lamination sandwich 10 passes completely through the upper heated pressure roller and the lower heated pressure roller. Lamination sandwich 10 thereafter exits the upper heated pressure roller and the lower heated pressure roller and comes to rest on an exit table 14 undisturbed until the trailing edge is cool to the touch; whereupon the topmost carrier can be peeled away from receiver stock and from the transferred color donor. With the configuration of an upper heated pressure roller and a lower heated pressure roller as described above, the laminator is called a straight-through laminator. Further details of this type of lamination/de-lamination system can be found in the above. As an additional reference, U.S. Pat. No. 5,203,942 describes a lamination/delamination system as applied to a drum laminator.

While the above-described laminator works well for a few materials and in limited conditions, there are many conditions and materials that cannot be laminated successfully using the above-described laminator. One problem is the intended image shifting from one color to another such that the dots/image from one color to the next are not overlaid correctly causing a misregistration of the intended image rendering it unacceptable. Also damage to some media may occur in the form of speckles/freckles or creases commonly know as rivers or valleys.

The aforementioned problems are for the most part due to the heated pressure rollers and there application. The upper heated pressure roller and the lower heated pressure roller have hollow cores that are typically made of metal. The hollow portion of the core is for accepting a heating rod or lamp while a rubber layer or shell typically of silicone rubber is formed around the outside of the core. However, in some cases there may be no rubber layer or shell. Typically one of the heated pressure rollers will have a different durometer. Typically one heated pressure roller has a 50–60 SHORE A durometer and the other a 65–80 SHORE A durometer and in some cases they are the same durometer. When the upper heated pressure roller and the lower heated pressure roller are pressed together they form a nip or indentation which is typically 7–10 mm wide and varies considerably along the length of the heated pressure rollers at a pressure of 40–80 PSI. Within the nip formed by the upper heated pressure roller and the lower heated pressure roller, lateral shear stresses and overdrive conditions are formed. These lateral sheer stresses and overdrive conditions act upon the media being laminated together to cause the intended image to shift from one color to another color. These lateral sheer stresses and overdrive conditions can also cause a defect in the final lamination in the form of creases commonly known as a rivers or valley, as described above. These lateral sheer stresses and overdrive conditions can also cause image growth which can be different with each color, causing the intended image to misregister from one color to the next color or to be larger than the original image or printed image.

Further drawbacks with the above mentioned conventional lamination arrangement is the creation of speckles/freckles, flutes and ripples in the paper (especially due to humidity on a subsequent pass of the paper), as well as the lack of control of the paper prior to entering the nip portion between the pressure rollers. Also, the conventional arrangements do not provide for an adequate mechanism to hold the paper down after it leaves the nip portion and is cooling down.

SUMMARY OF THE INVENTION

The present invention provides for a laminator assembly and method which overcomes the drawbacks noted above. The laminator assembly and method of the present invention provides for belt roller arrangement which applies a tapering pressure to a lamination sandwich (hereinafter referred to as media to be laminated), and conveys the media to be laminated to a nip portion between heated pressure rollers. In a further feature of the present invention, control nips can be provided on either or both sides of the heated pressure rollers so as to minimize or reduce flutes and ripples, and also to gain control of the media.

The present invention provides for a laminator which comprises a first roller arrangement arranged on a first side of a media passage; a first endless belt disposed around the first roller arrangement; a second roller arrangement arranged on a second side of the media passage which is opposite the first side; and a second endless belt disposed around the second roller arrangement. The media passage is defined between facing portions of the first and second endless belts which apply a first pressure to the media as the media passes through the media passage. The first roller arrangement comprises a first heated roller and the second roller arrangement comprises a second heated roller positioned opposite the first heated roller. The first and second heated rollers apply a second pressure to media in the media passage as the media passes between the first and second heated rollers, with the second pressure being greater than the first pressure.

The present invention further provides for a laminator assembly which comprises a belt arrangement located on a first side of a media passage; and a roller located on a second side of the media passage opposite the first side. The belt arrangement comprises an idler roller, a first heated roller and an endless belt which surrounds the idler roller and the first heated roller. The roller located on the second side of the media passage defines a second heated roller and is positioned opposite the first heated roller so as to define a nip portion therebetween. The first and second heated rollers apply pressure to media in the media passage as the media passes the nip portion.

The present invention also provides for a laminator assembly that comprises a first pressure application arrangement located on a first side of a media passage; and a second pressure application arrangement located on a second side of the media passage which is opposite the first side. At least one of the first and second pressure application arrangement comprises a pressure roller, an idler roller and an endless belt which surrounds the pressure roller and the idler roller.

The present invention further provides for a method of laminating media that comprises the steps of passing a media to be laminated between first and second endless belts which apply a first pressure to the media; and providing a second pressure to the media passing between the first and second endless belts by way of first and second opposing pressure rollers respectively located within each of the first and second endless belts.

The present invention further provides for a method of laminating media that comprises the steps of passing a media to be laminated between first and second pressure roller arrangements which apply a first pressure to the media, such that at least one of the first and second pressure roller arrangements comprises an idler roller, a pressure roller and an endless belt which surrounds the idler roller and the pressure roller; and applying a second pressure to the media passing between the first and second pressure arrangements by way of a plate assembly.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed, in particular, to elements forming part of, or cooperating more directly with, an apparatus in accordance with the present invention. It is to be understood that elements not specifically shown or described may take various forms well known to those skilled in the art. For the sake of discussion, but not limitation, the preferred embodiment of the present invention will be illustrated in relation to a laminating apparatus for making image proofs on a paper receiver stock, since the usual proofing practice is to make a hard copy of the image proof on paper. The present invention, however, is not limited to making hard copies of proof images on paper, since it can produce hard copies of images on a wide variety and thicknesses of media that may be used in the printing process or other uses requiring heat and/or pressure to laminate.

Figure 1:
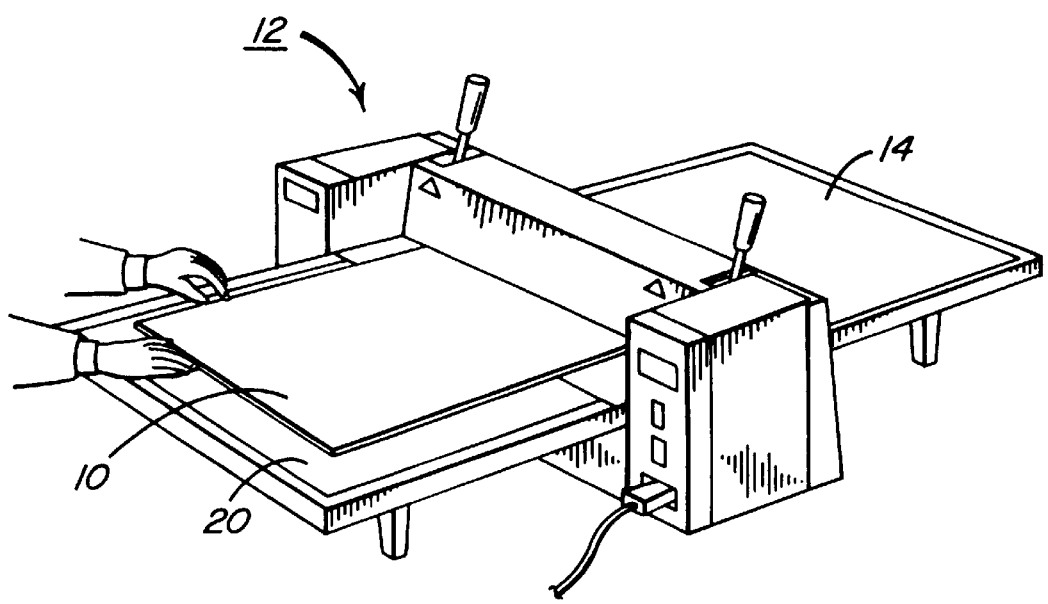
FIG. 1 is a perspective view showing a laminator known in the related art.
Figure 2A:
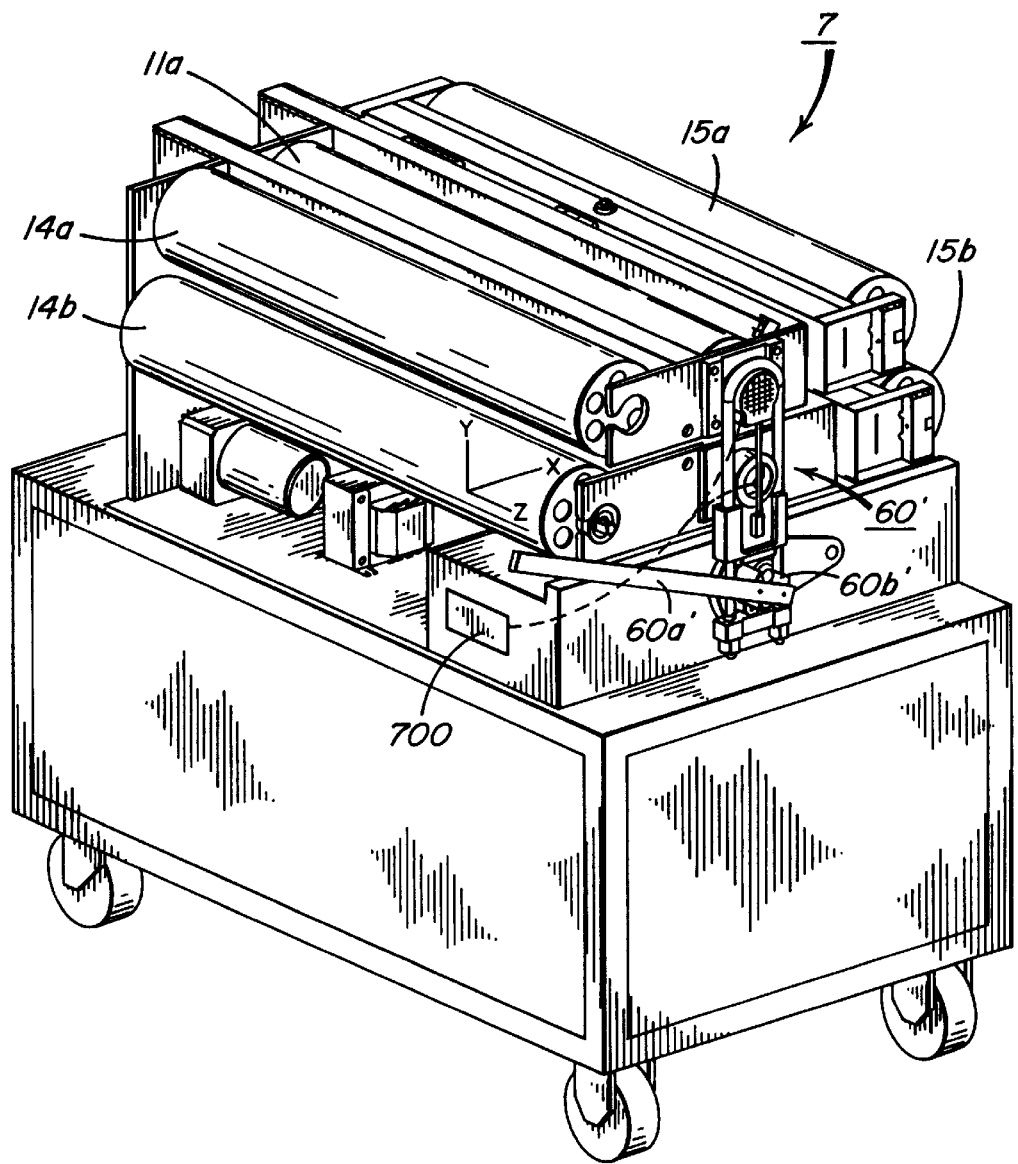
FIGS. 2a and 2b are perspective views of a laminator according to the present invention.
Figure 2B:
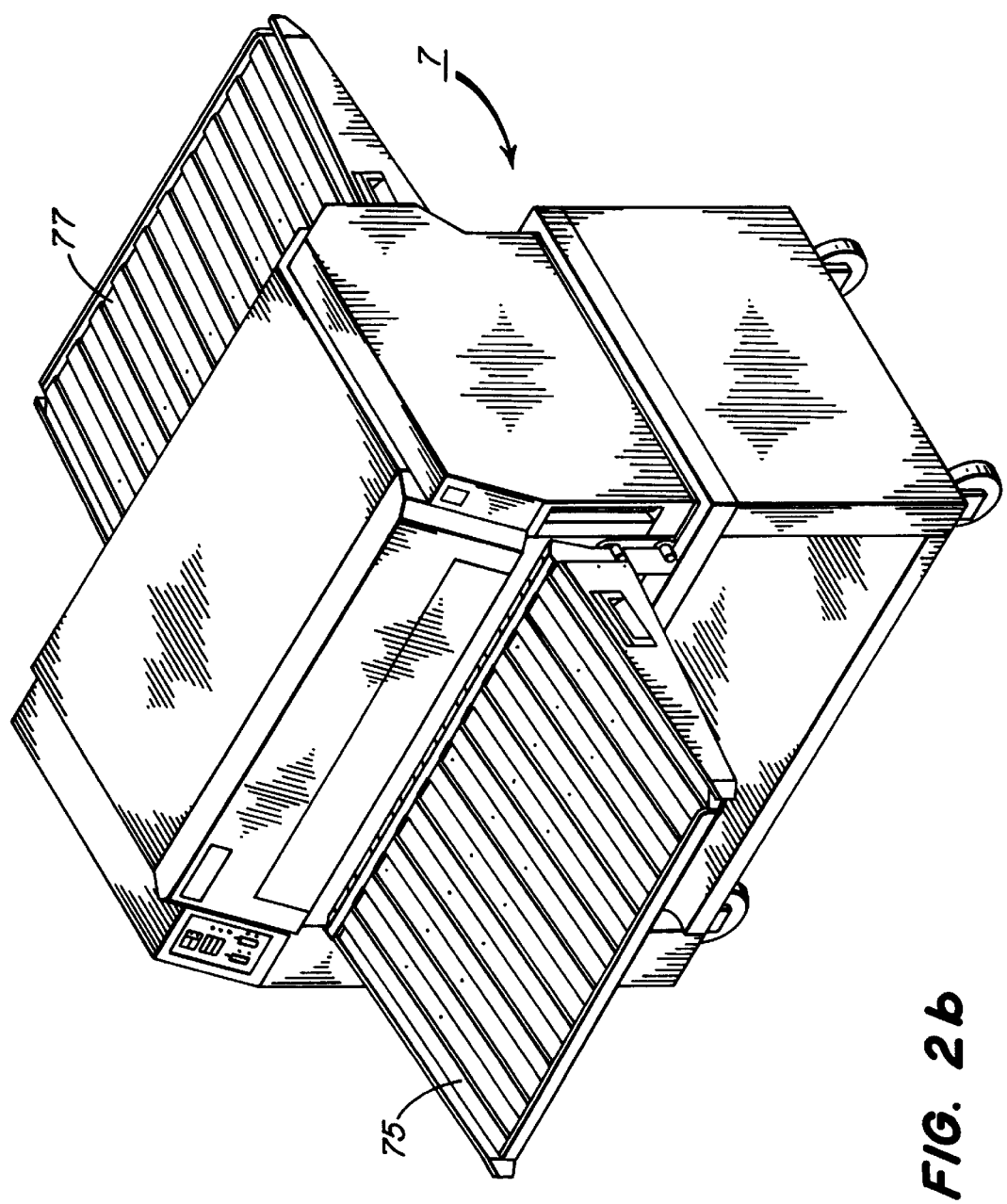
Figure 3:
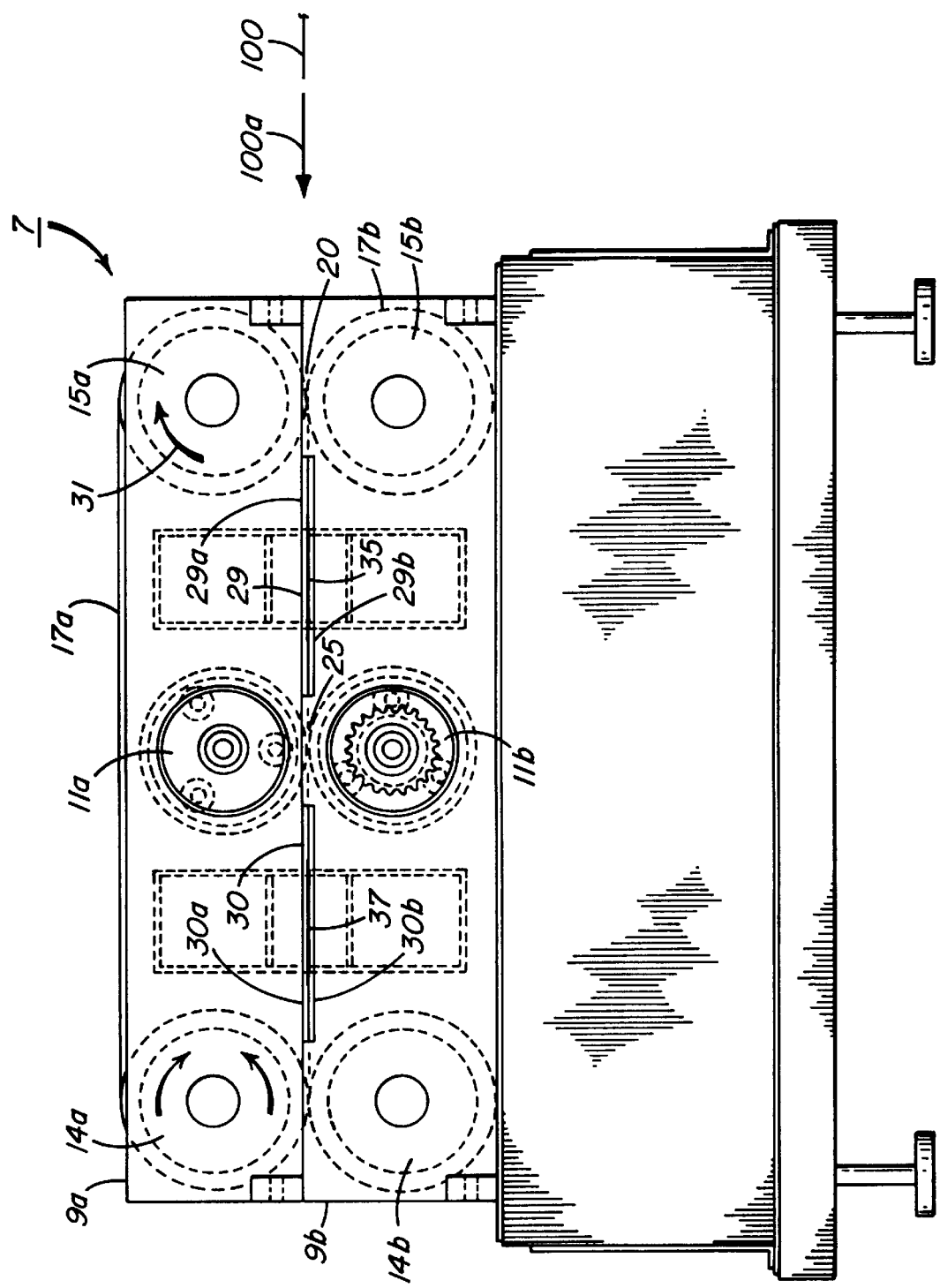
FIG. 3 is a side view of a laminator according to the present invention.

Referring now to the drawings, wherein like reference numerals represent identical or corresponding parts throughout the several views, FIGS. 2a, 2b and 3 illustrate a first embodiment of a belt laminator 7 in accordance with the present invention. FIG. 2a illustrates a perspective view of belt laminator 7, while FIG. 3 shows a side view. As clearly shown in FIG. 3, belt laminator 7 includes a first roller arrangement 9a and a second roller arrangement 9b. First roller arrangement 9a comprises a heated pressure roller 11a and idler rollers 14a, 15a disposed on either side of heated pressure roller 11a. Heated pressure roller 11a can be a known heated pressure roller having a heated core. As shown in FIG. 3, an endless belt 17a surrounds idler rollers 14a, 15a and heated pressure roller 11a.

As also shown in FIG. 3, second roller arrangement 9b is disposed on a second side of a media passage 20 so as to oppose first roller arrangement 9a. Therefore, media passage 20 for a lamination sandwich (hereinafter referred to as media 100 to be laminated) is located between first and second roller arrangements 9a, 9b. Second roller arrangement 9b includes a heated pressure roller 11b which can be a driven roller, and opposes heated pressure roller 11a. Heated pressure roller 11b can be driven by any well known gearing arrangement. Second roller arrangement 9b further includes idler rollers 14b,15b. An endless belt 17b surrounds heated pressure roller 11b and idler rollers 14b, 15b. Thus, media passage 20 is defined between facing portions of endless belts 17a,17b. Depending on design considerations, idler rollers 14b,15b can be preferably offset with respect to idler rollers 14a,15a as shown in FIG. 2 to facilitate entry and exit of media 100; or can be opposed to idler rollers 14a,15a as shown in FIG. 3.

During use of the embodiment of FIGS. 2a, 2b and 3 media 100 to be laminated is placed on a tray 75 as shown in FIG. 2b. Media 100 is then conveyed along media passage 20 (FIG. 3) and subjected to an increasing pressure which is applied by first and second roller arrangements 9a, 9b. That is endless belts 17a, 17b of first and second roller arrangements 9a,9b apply an increasing pressure to media 100 as media 100 approaches pressure rollers 11a,11b. When media 100 reaches pressure rollers 11a, 11b, a second pressure greater than the pressure applied by endless belts 17a,17b is applied at a nip portion 25 between pressure rollers 11a, 11b to provide for lamination.

As illustrated in FIG. 3, the present invention can include controlling nips upstream or downstream or both upstream and downstream of heated pressure rollers 11a,11b. The controlling nips are provided by way of plate assemblies 29 and 30 as shown in FIG. 3. Although FIG. 3 shows plate assemblies 29 and 30 on both sides of heated pressure rollers 11a,11b, it is recognized that the present invention can be utilized using only one plate assembly 29 or 30 on either side of pressure rollers 11a, 11b.

It is further recognized that the belts 17a,17b can be operated in both forward and reverse directions and thus media to be laminated can be introduced into either side of laminator 7 depending on the direction of rotation of belts 17a,17b.

In FIG. 3, assuming that media to be laminated 100 is inserted in the direction of arrow 100a, belts 17a,17b rotating in the direction of arrows 31 will apply a tapering first pressure to media 100 and convey media 100 to plate assembly 29. Plate assembly 29 which is upstream of heated pressure rollers 11a, 11b, with respect to the conveying direction of the media, includes a first plate 29a within endless belt 17a, and a second plate 29b which opposes first plate 29a and is disposed within endless belt 17b. Plates 29a, 29b extend along the width of the endless belts 17a,17b and create an upstream controlling nip portion 35, where an upstream pressure is applied to media 100 prior to media 100 arriving at heated pressure rollers 11a,11b. This is effective to flatten any flutes in media 100 (especially on a subsequent pass of media 100 through laminator 7) and also to gain control of media 100 prior to media 100 arriving at nip portion 25. Plates 29a,29b can be weighted plates or at least one of the plates 29a,29b can be of a ferromagnetic or magnetic material.

After media to be laminated 100 exits nip portion 35, it is conveyed to nip portion 25 between heated pressure rollers 11a,11b where a second pressure is applied for lamination.

After media 100 exits nip portion 25, it is conveyed to plate assembly 30 which in the example of FIG. 3 is a downstream plate assembly. As shown in FIG. 3, plate assembly 30 comprises a first plate 30a disposed within endless belt 17a, and a second plate 30b located opposite first plate 30a and disposed within endless belt 17b. First and second plates 30a, 30b create a second controlling nip portion 37 downstream of heated pressure rollers 11a,11b in the example of FIG. 3, and apply a downstream pressure to media 100 after media 100 exits nip portion 25. This is effective to remove any ripples in media 100 and to hold media 100 flat as it cools down. Like plates 29a,29b, plates 30a, 30b can be weighted, ferro-magnetic or magnetic plates. After media 100 exits laminator 7, it is conveyed onto on tray 77 (FIG. 2b) and processed in a known manner such as disclosed in, for example, U.S. Pat. No. 5,203,942.

Figure 4:
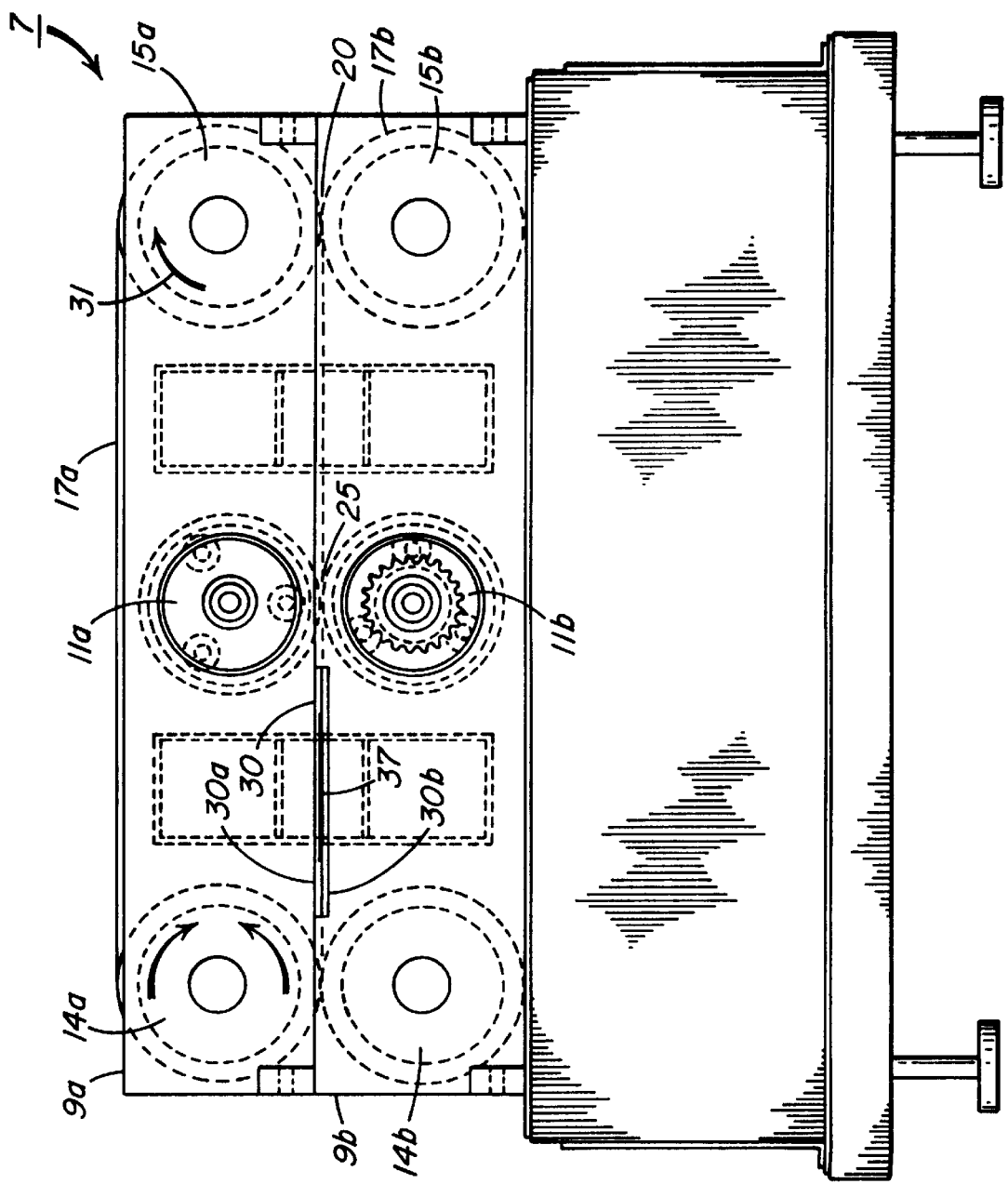
FIG. 4 shows a further embodiment of the laminator of FIG. 3.

In the embodiment of FIG. 4, only one plate assembly 30 is shown downstream of heated pressure rollers 11a,11b. This is also effective for removing ripples from media 100. Of course, as described above, laminator 7 of the present invention can have upstream and downstream plate assemblies 29,30; can be used with only one plate assembly 29,30 either downstream or upstream of heated pressure rollers 11a,11b; or can be used without plate assemblies 29,30.

Figure 5:
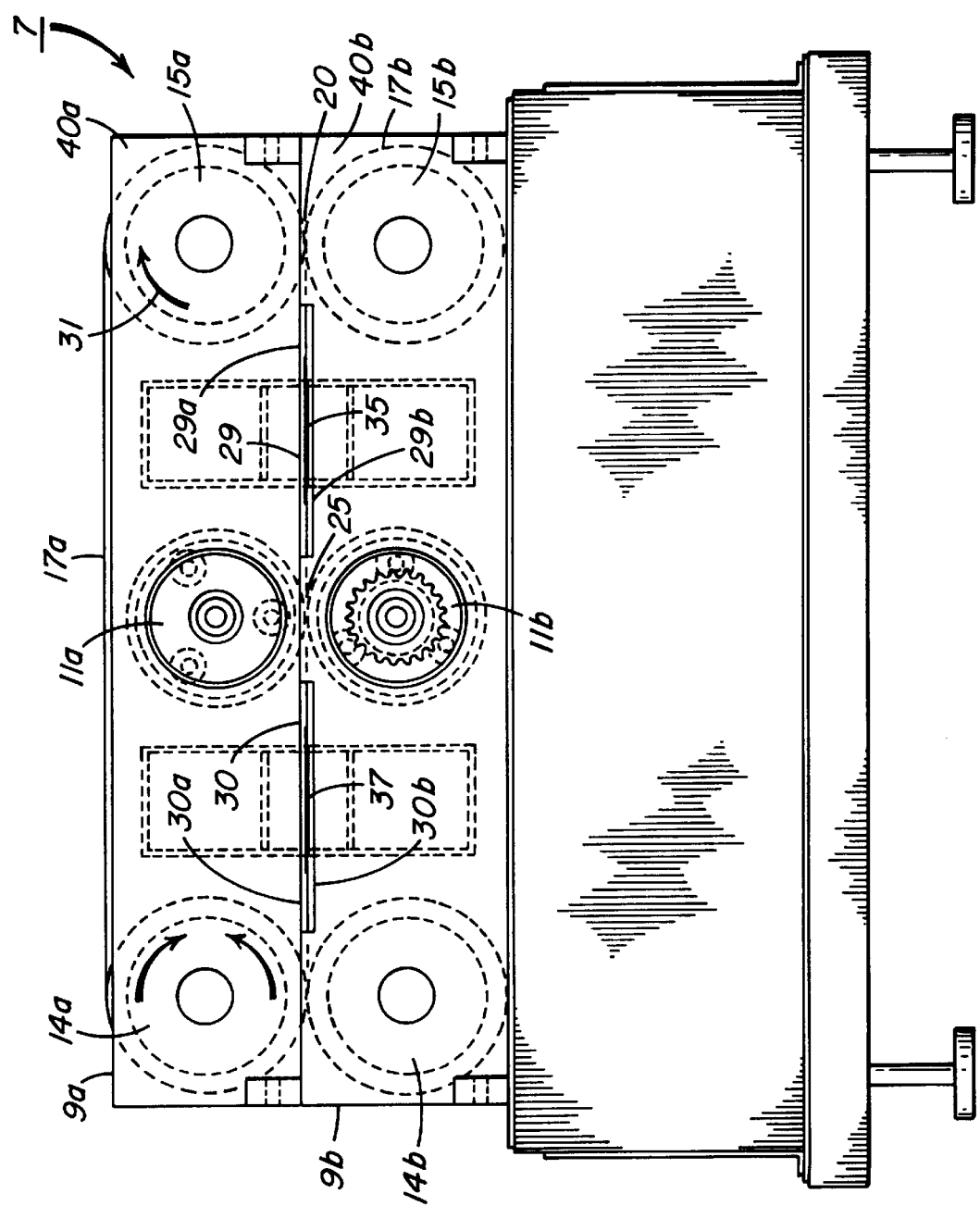
FIG. 5 illustrates a further feature of the laminator of the present invention.

Referring to FIG. 5, in a further feature of the present invention, one or both roller arrangements 9a,9b can be enclosed by a heat shield 40a,40b. Each of heat shields 40a,40b can have closed ends so as to focus heat toward media passage 20 and thereby act as an oven which promotes the lamination process.

Figure 6:
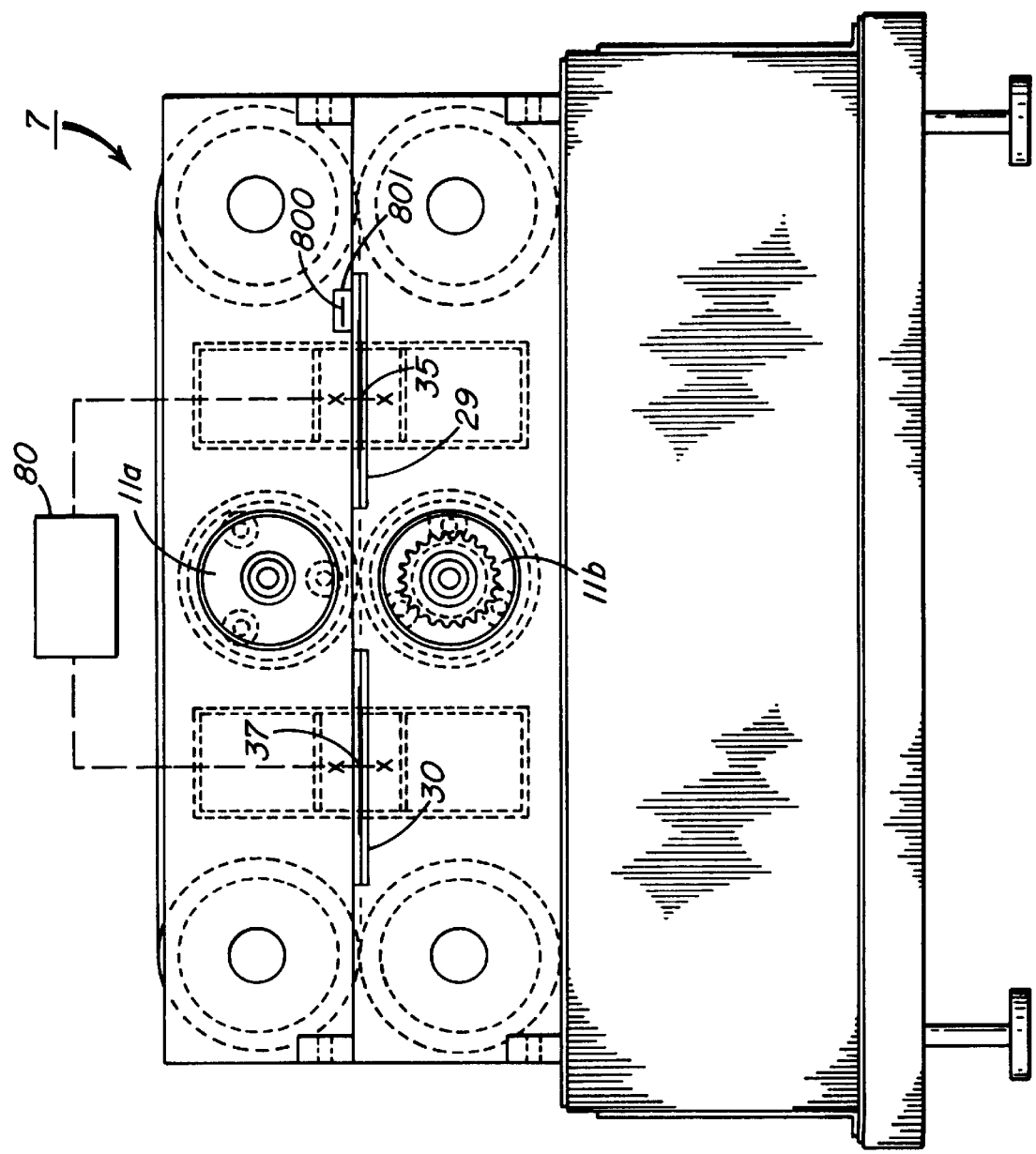
FIG. 6 illustrates a further feature of the laminator of the present invention.

Referring to FIG. 6, in a further feature of the present invention, a cooling device 80 in the form of, for example, an air blower can be implemented to supply cooling air to either or both nip portions 35 and 37. In a preferred embodiment, depending on the conveying direction of media 100, the cooling air is applied to downstream nip portion 37 to minimize or stop thermal forming after lamination. It is recognized that the application of cooling air can be selectively controlled to apply cooling air to either nip portion 35,37 depending on the conveying direction of media 100. Also, the present invention can provide a preheating of, for example, upstream nip 35 by way of a heating element 800 provided in a plate 801. This preheating is effective when laminating thick media.

Figure 7:
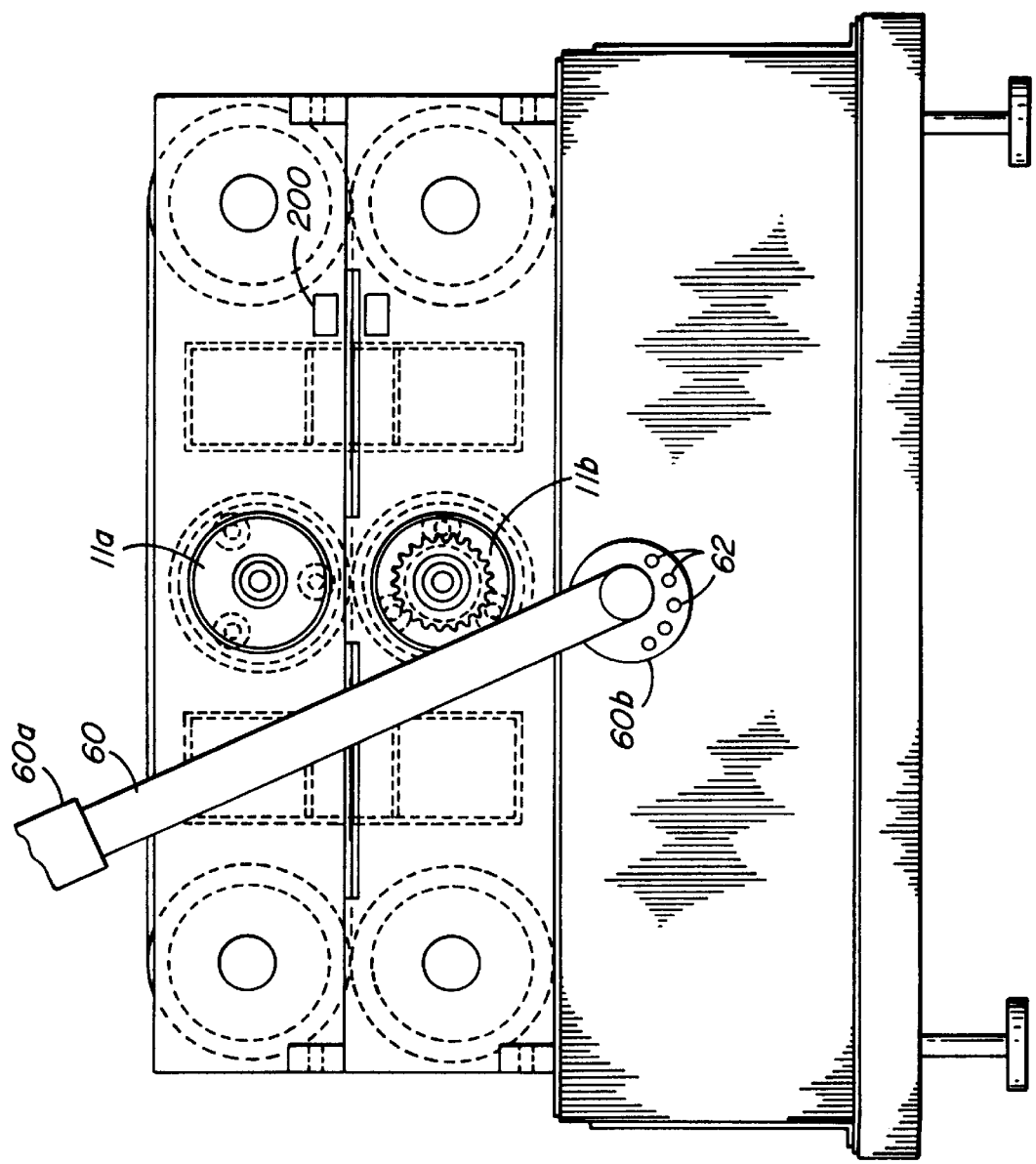
FIG. 7 illustrates a further feature of the laminator of the present invention.

Referring to FIG. 7, in a further feature of the present invention, a lever and roller arrangement 60 can be used to control the amount of pressure supplied by first and second heated pressure rollers 11a, 11b. Lever and roller arrangement 60 can include a lever 60a and a roller 60b having different pressure settings 62. Rotation of lever 60a causes a movement of one of heated pressure rollers 11a,11b toward the other heated pressure roller 11a, 11b. In the case of FIG. 7, roller 60b abuts against a shaft of heated pressure roller 11b to cause a movement of heated pressure roller 11b against heated pressure roller 11a. The eccentricity of roller 60b can be modified by operation of pressure settings 62 which can be, for example, detents. This will then cause a modification of the amount of pressure applied to heated pressure roller 11b and will also change the width of nip portion 25 between heated pressure rollers 11a,11b. It is noted that the present invention is not limited to the lever and roller arrangement 60 shown, and that an electronic control can be used to move heated pressure rollers 11a,11b in the same manner achieved by lever and roller arrangement 60. For example, electronically controlled gearing, hydraulic pressure, solenoid operated valves, etc. can be used to move heated pressure rollers 11a, 11bagainst each other. Further, a sensor 200 can be provided in media passage 20 to sense the thickness of the media to be laminated. The signal from sensor 200 can be manually provided to an operator or can be automatically supplied to a control device to set the pressure applied by heated pressure rollers 11a,11b in accordance with the measured thickness of the media to be laminated.

Also, as shown in FIG. 2a, the control mechanism can take the form of a clamp assembly 60' which includes a lever 60a' and an eccentric roller 60b'. Rotation of lever 60a' causes roller 60b' to abut against heated pressure roller 11b and thereby force heated pressure roller 11b against heated pressure roller 11a. As in FIG. 7, the eccentricity of roller 60b' can be modified to adjust the application of pressure and modify the nip width.

As further shown in FIG. 2a, laminator 7 could include a control mechanism 700 which is operationally associated by way of a thermistor with the heating cores of heated pressure rollers 11a, 11b. Control mechanism 700 can be operated to individually and/or selectively sense and/or control the temperature of each of heated pressure rollers 11a, 11b, based on the type of media to be laminated.

Figure 8:
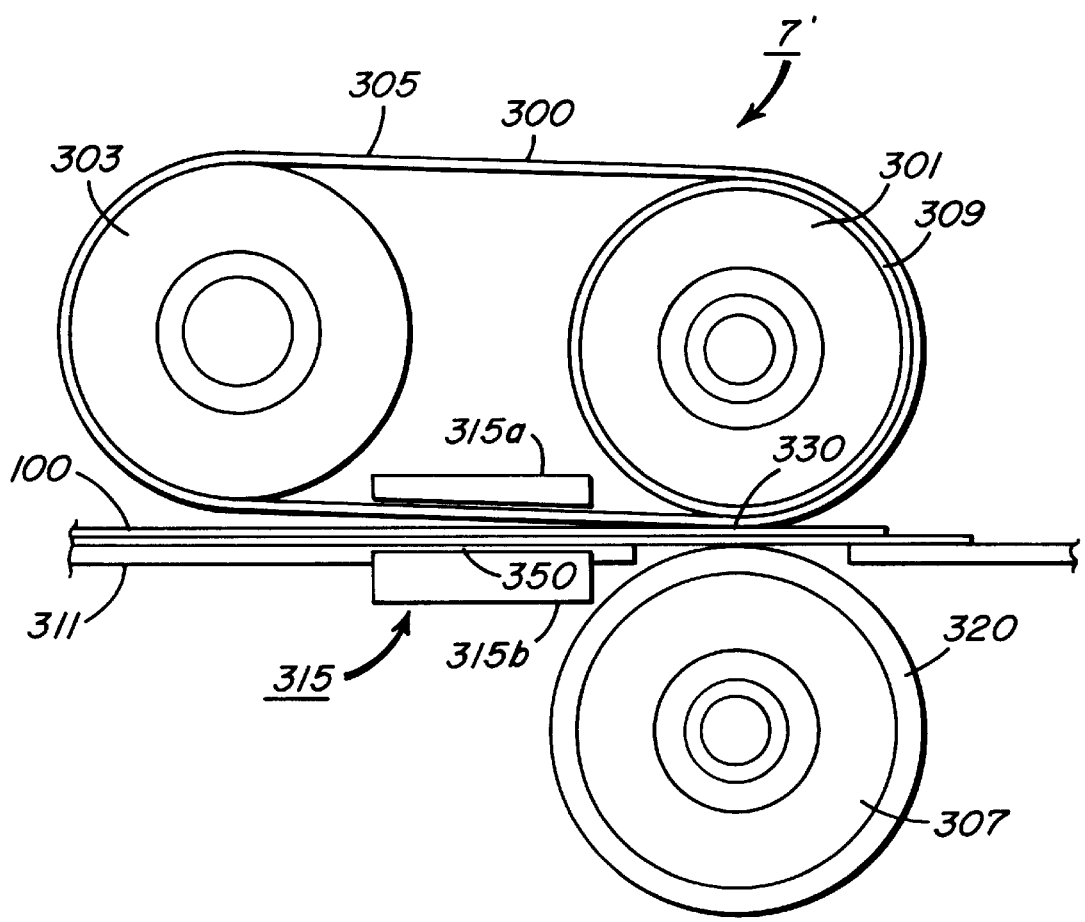
FIG. 8 illustrates a side view of a second embodiment of the laminator of the present invention.

FIG. 8 illustrates a further embodiment of the laminator of the present invention. In laminator 7' of FIG. 8, only one endless belt is utilized. As illustrated in FIG. 8, laminator 7' includes an upper roller arrangement 300 which comprises a heated pressure roller 301, an idler roller 303 and an endless belt 305 which surrounds heated pressure roller 301 and idler roller 303. Heated pressure roller 301 can include an outer rubber roller cover 309 as illustrated in FIG. 8. Laminator 7' further includes a second heated pressure roller 307 which opposes heated pressure roller 301 as shown in FIG. 8. Heated pressure roller 307 also includes an outer rubber cover 320 as illustrated in FIG. 8.

Laminator 7' further includes a guide member 311 which guides media 100 to a nip portion 330 formed between heated pressure rollers 301 and 307. Heated pressure rollers 301 and 307 can be known heated rollers having a heating element or heating core.

In laminator 7', a plate assembly 315 is positioned upstream of heated pressure rollers 301 and 307. As shown in FIG. 8, plate assembly 315 includes a first plate 315*a* which is located within endless belt 305, and a second plate 315*b* which opposes first plate 315*a*. The plates 315*a* and 315*b* define a nip portion 350 which is applied to media 100 prior to media 100 reaching nip portion 330 between heated pressure rollers 301 and 307. As in the embodiment of FIG. 3, plate assembly 315 serves to flatten any flutes in the media prior to the media reaching the heated pressure rollers 301 and 307, and also to gain control of the media prior to the media entering the nip portion 330 between the heated pressure rollers 301 and 307.

As a further feature of the present invention, it is recognized that heated pressure rollers 11*a*, 11*b*, 301 and 307 of the present invention can be constructed as disclosed in commonly assigned co-pending application attorney Docket No. 78274.

The invention has been described in detail with particular reference to certain preferred embodiments thereof, but it will be understood that variations and modifications can be effected within the spirit and scope of the invention.

What is claimed is:

1. A laminator assembly comprising:

a first roller arrangement arranged on a first side of a media passage;

a first endless belt disposed around said first roller arrangement;

a second roller arrangement arranged on a second side of said media passage with is opposite said first side;

a second endless belt disposed around said second roller arrangement, said media passage being defined between facing portions of said first and second endless belts which apply a first pressure to said media as said media passes through said media passage;

wherein said first roller arrangement comprises a first heated roller and said second roller arrangement comprises a second heated roller positioned opposite said first heated roller, said first and said second heated rollers applying a second pressure to media in said media passage as said media passes between said first and second heated rollers, said second pressure being greater than said first pressure;

wherein at least one of said heated rollers is a drive roller; and wherein said first roller arrangement further comprises first and second idler rollers disposed on opposite sides of said first heated roller, and said second roller arrangement comprises third and fourth idler rollers disposed on opposite sides of said second heated roller.

2. A laminator assembly according to claim 1, further comprising an upstream plate assembly located upstream of said first and second heated rollers with respect to a conveying direction of said media, said upstream plate assembly applying an upstream pressure to said media prior to said media reaching a nip portion between said first and second heated rollers.

3. A laminator assembly according to claim 2, wherein said upstream plate assembly comprises a first upstream plate positioned within said first endless belt so as to face said media passage and a second upstream plate positioned within said second endless belt opposite said first plate so as to face said media passage, said first and second upstream plates defining an upstream nip portion and applying said upstream pressure to said media as said media passes said upstream nip portion.

4. A laminator assembly according to claim 3, wherein at least one said first upstream plate and said second upstream plate is a magnetic plate.

5. A laminator assembly according to claim 2, further comprising a downstream plate assembly located downstream of said first and second heated rollers with respect to said conveying direction of said media, said downstream plate assembly applying a downstream pressure to said media after said media exits said nip between said first and second heated rollers.

6. A laminator assembly according to claim 5, wherein said downstream plate assembly comprises a first downstream plate positioned within said first endless belt so as to face said media passage and a second downstream plate positioned within said second endless belt opposite said first downstream plate so as to face said media passage, said first and second downstream plates defining a downstream nip portion therebetween and applying said downstream pressure to said media as said media passes said downstream nip portion.

7. A laminator according to claim 6, wherein at least one of said first downstream plate and said second downstream plate is a magnetic plate.

8. A laminator according to claim 1, further comprising a downstream plate assembly located downstream of said first and second heated rollers with respect to a conveying direction of said media, said downstream plate assembly applying a downstream pressure to said media after said media exits a nip portion between said first and second heated rollers.

9. A laminator according to claim 8, wherein said downstream plate assembly comprises a first downstream plate positioned within said first endless belt so as to face said media passage and a second downstream plate positioned within said second endless belt opposite said first downstream plate so as to face said media passage, said first and second downstream plates defining a downstream nip portion therebetween and applying said downstream pressure to said media as said media passes said downstream nip portion.

10. A laminator according to claim 9, wherein at least one of said first and second downstream plates is a magnetic plate.

11. A laminator assembly according to claim 1, further comprising a heat shield which covers said first and second endless belts so as to form an oven.

12. A laminator assembly according to claim 5, further comprising a cooling mechanism which cools said downstream nip portion.

13. A laminator assembly according to claim 8, further comprising a cooling mechanism which cools said downstream nip portion.

14. A laminator assembly according to claim 1, further comprising a pressure control assembly for controlling said second pressure applied by said first and second heated rollers.

15. A laminator assembly according to claim 14, wherein said pressure control assembly comprises a lever and roller arrangement which controls a movement of a least one of said first and second heated rollers.

16. A laminator assembly according to claim 1 wherein said second pressure to said media is in the range of 20 to 120 PSI.

17. A laminator assembly according to claim 16 wherein said second pressure to said media is in the range of 80 to 90 PSI.

18. A laminator assembly according to claim 1 wherein said first pressure is in the range of 5 to 20 PSI.

* * * * *